(12) United States Patent
Burghard et al.

(10) Patent No.: US 7,362,212 B2
(45) Date of Patent: Apr. 22, 2008

(54) COMMUNICATION METHODS, SYSTEMS, APPARATUS, AND DEVICES INVOLVING RF TAG REGISTRATION

(75) Inventors: Brion J. Burghard, W. Richland, WA (US); James R. Skorpik, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 364 days.

(21) Appl. No.: 10/950,047

(22) Filed: Sep. 24, 2004

(65) Prior Publication Data

US 2006/0071757 A1    Apr. 6, 2006

(51) Int. Cl.
H04Q 5/22 (2006.01)

(52) U.S. Cl. .................. 340/10.2; 340/10.1; 340/10.3; 340/10.4

(58) Field of Classification Search ............... 340/10.2, 340/10.1, 10.3, 10.4, 10.5; 370/336, 445; 342/42–44, 51

See application file for complete search history.

(56) References Cited

U.S. PATENT DOCUMENTS

| | | | |
|---|---|---|---|
| 3,836,842 A | 9/1974 | Zimmermann et al. | |
| 3,961,323 A | 6/1976 | Hartkorn | |
| 4,468,656 A | 8/1984 | Clifford | |
| 5,347,274 A | 9/1994 | Hassett | |
| 5,365,551 A | 11/1994 | Snodgrass et al. | |
| 5,434,572 A * | 7/1995 | Smith .......................... | 342/44 |
| 5,500,650 A | 3/1996 | Snodgrass et al. | |
| 5,511,553 A | 4/1996 | Segalowitz | |
| 5,521,601 A | 5/1996 | Kandlur et al. | |
| 5,528,222 A | 6/1996 | Moskowitz et al. | |
| 5,528,232 A | 6/1996 | Verma et al. | |
| 5,530,702 A | 6/1996 | Palmer et al. | |
| 5,550,547 A | 8/1996 | Chan et al. | |
| 5,552,772 A | 9/1996 | Janky et al. | |
| 5,565,858 A | 10/1996 | Guthrie | |
| 5,583,850 A | 12/1996 | Snodgrass et al. | |

(Continued)

FOREIGN PATENT DOCUMENTS

EP    0 467 036    1/1992

(Continued)

OTHER PUBLICATIONS

Kreller, Birgit; et al. "The Field Trial Scenario of an Inter-Modal, End-to-End and Real-Time Tracking and Tracing System," IST project ParcelCall, Commission of the European Community, as early as Dec. 31, 2001.

(Continued)

Primary Examiner—Brian Zimmerman
Assistant Examiner—Nam Nguyen
(74) Attorney, Agent, or Firm—Klarquist Sparman, LLP

(57) ABSTRACT

One technique of the present invention includes a number of Radio Frequency (RF) tags that each have a different identifier. Information is broadcast to the tags from an RF tag interrogator. This information corresponds to a maximum quantity of tag response time slots that are available. This maximum quantity may be less than the total number of tags. The tags each select one of the time slots as a function of the information and a random number provided by each respective tag. The different identifiers are transmitted to the interrogator from at least a subset of the RF tags.

44 Claims, 6 Drawing Sheets

U.S. PATENT DOCUMENTS

| | | | |
|---|---|---|---|
| 5,606,313 | A | 2/1997 | Allen et al. |
| 5,640,151 | A | 6/1997 | Reis et al. |
| 5,686,902 | A | 11/1997 | Reis et al. |
| 5,741,462 | A | 4/1998 | Nova et al. |
| 5,764,138 | A | 6/1998 | Lowe |
| 5,815,090 | A | 9/1998 | Su |
| 5,892,441 | A | 4/1999 | Woolley et al. |
| 5,917,433 | A | 6/1999 | Keillor et al. |
| 5,936,523 | A | 8/1999 | West |
| 5,939,982 | A | 8/1999 | Gagnon et al. |
| 5,942,987 | A | 8/1999 | Heinrich et al. |
| 5,957,854 | A | 9/1999 | Besson et al. |
| 5,973,613 | A | 10/1999 | Reis et al. |
| 6,002,344 | A | 12/1999 | Bandy et al. |
| 6,023,610 | A | 2/2000 | Wood, Jr. |
| 6,031,454 | A | 2/2000 | Lovejoy et al. |
| 6,091,342 | A * | 7/2000 | Janesch et al. ............ 340/10.2 |
| 6,111,520 | A | 8/2000 | Allen et al. |
| 6,111,872 | A * | 8/2000 | Suematsu et al. .......... 370/350 |
| 6,118,789 | A | 9/2000 | Wood, Jr. |
| 6,150,921 | A | 11/2000 | Werb et al. |
| 6,208,247 | B1 | 3/2001 | Agre et al. |
| 6,226,300 | B1 | 5/2001 | Hush et al. |
| 6,265,962 | B1 | 7/2001 | Black et al. |
| 6,275,476 | B1 | 8/2001 | Wood, Jr. |
| 6,297,734 | B1 | 10/2001 | Richardson et al. |
| 6,300,903 | B1 | 10/2001 | Richards et al. |
| 6,366,622 | B1 | 4/2002 | Brown et al. |
| 6,447,448 | B1 | 9/2002 | Ishikawa et al. |
| 6,512,478 | B1 | 1/2003 | Chien |
| 6,535,109 | B1 * | 3/2003 | Mahdavi .................... 340/10.3 |
| 6,538,563 | B1 * | 3/2003 | Heng ........................ 340/10.2 |
| 6,806,808 | B1 * | 10/2004 | Watters et al. ........... 340/10.41 |
| 6,812,852 | B1 * | 11/2004 | Cesar .................... 340/825.69 |
| 6,842,116 | B2 * | 1/2005 | Hum et al. .............. 340/573.4 |
| 6,963,270 | B1 * | 11/2005 | Gallagher et al. ......... 340/10.2 |
| 7,005,965 | B2 * | 2/2006 | Chen et al. ................ 340/10.2 |
| 2001/0041948 | A1 | 11/2001 | Ross et al. |
| 2002/0000916 | A1 | 1/2002 | Richards |
| 2002/0063622 | A1 | 5/2002 | Armstrong et al. |
| 2003/0001009 | A1 | 1/2003 | Collins et al. |
| 2003/0004624 | A1 | 1/2003 | Wilson et al. |
| 2003/0052161 | A1 | 3/2003 | Rakers et al. |
| 2003/0067414 | A1 | 4/2003 | Cole et al. |
| 2003/0072288 | A1 | 4/2003 | Kuffner et al. |
| 2003/0072322 | A1 | 4/2003 | Collins et al. |
| 2003/0137403 | A1 | 7/2003 | Carrender et al. |
| 2003/0179078 | A1 | 9/2003 | Chen et al. |
| 2004/0046642 | A1 | 3/2004 | Becker et al. |
| 2004/0046644 | A1 | 3/2004 | Bauhahn |
| 2004/0048579 | A1 | 3/2004 | Becker et al. |
| 2004/0066278 | A1 | 4/2004 | Hughes et al. |
| 2004/0111338 | A1 | 6/2004 | Bandy et al. |
| 2005/0027604 | A1 | 2/2005 | Bandy et al. |
| 2006/0114103 | A1 * | 6/2006 | Usami ....................... 340/10.2 |

FOREIGN PATENT DOCUMENTS

| | | |
|---|---|---|
| EP | 1372103 A1 | 12/2003 |
| GB | 2342998 A | 4/2000 |
| WO | WO 99/26462 | 6/1999 |
| WO | WO 02/41650 A1 | 5/2002 |
| WO | WO 03/098528 A2 | 11/2003 |
| WO | WO 03/107256 A1 | 12/2003 |
| WO | 2004/059867 | 7/2004 |

OTHER PUBLICATIONS

Mason, Andrew, et al. "A Generic Multielement Microsystem for Portable Wireless Applications." Proceedings of the IEEE, Aug. 1998, pp. 1733-1746, vol. 86, No. 8.

Eidson, John C. and Stan P. Woods. "A Research Prototype of a Networked Smart Sensor System." HPL-95-91, Aug. 1995, pp. 1-20.

Sinha, Amit and Anantha Chandrakasan. "Dynamic Power Management in Wireless Sensor Networks." IEEE Design & Test of Computers, 2001, pp. 62-74.

Corr, Michael G. and C.M. Okino. "Networking Reconfigurable Smart Sensors." Dartmouth College, Hanover, NH, date unknown, (Aug. 1995).

* cited by examiner

COMMUNICATION METHODS, SYSTEMS, APPARATUS, AND DEVICES INVOLVING RF TAG REGISTRATION

BACKGROUND

The present invention relates to communications, and more particularly, but not exclusively relates to the registration of RF tag devices with an interrogator.

It is becoming more common place to use Radio Frequency (RF) tags for object tracking, product manufacturing, inventory control, merchandising operations, remote sensing, and the like. RF tags are frequently in the form of an electronic device that transmits data in response to an interrogation signal from a reader. Such a device may be "active"—having an independent power source, and/or passive—deriving operational power from the interrogation signal.

In some applications, multiple RF tags are distributed within a region. If the reader has prior information regarding the identity and/or quantity of RF tags within communication range of the reader, the reader can specify that a response be provided only from a certain device or devices; however, sometimes the specific identity/quantity of RF tags within range is initially unknown to the reader. In one form, each RF tag device may be provided with a unique identification code that is transmitted in response to the interrogation signal to distinguish between a number of different devices subject to interrogation by the reader. For such an arrangement, when the reader sends the interrogation signal, there is a possibility that multiple devices will attempt to respond simultaneously, causing a communication collision, and usually an improper message to be received by the interrogator.

Accordingly, various arbitration schemes have been developed to avoid collisions and/or capitalize on the occurrence of communication collisions to identify responding RF tags. However, in some cases, more efficient and/or more cost-effective techniques are desired. Thus, there is an ongoing need for further contributions in this area of technology.

SUMMARY

One embodiment of the present application relates to a unique communication technique. Other embodiments include unique methods, systems, devices, and apparatus for registering RF tags with an interrogator.

In a further embodiment of the present application, a communication device includes a processing subsystem effective to determine a time slot to transmit a unique identifier relative to a number of other devices. This time slot is determined as a function of a parameter transmitted to the device that corresponds to a maximum quantity of tag transmission time slots. In one form, this device includes RF tag communication circuitry and further includes a random number generator. This random number generator may be seeded in accordance with the transmitted information and the resulting random number also used in selecting the time slot. Typically, the maximum quantity of the time slot is less than the quantity of deployed devices by at least one order of magnitude. As used herein, "order of magnitude" refers to the base ten form; where one order of magnitude corresponds to a factor of 10, two orders of magnitude corresponds to a factor of 100, . . . , and the "x" order of magnitude corresponds to a factor of $10^x$.

Another embodiment includes operating several RF tags within communication range of an RF tag interrogator. These tags each include a respective random number generator and a respective one of several different identification numbers. Furthermore, the RF tags each: seed the respective random number generator with the respective one of the different identification numbers to generate a first random number, determine a first time period to transmit the respective one of the different identification numbers as a function of the first random number, seed the respective random number generator with the first random number to provide a second random number if transmission during the first time period fails to be properly performed, and determine a second time period to transmit the respective one of the unique identification numbers to the interrogator as a function of the second random number.

Still another embodiment includes: operating several RF tags within communication range of an RF tag interrogator. These tags each include a respective random number generator and a respective one of several different identification numbers. The different identification numbers are each unique relative to one another. One or more of the RF tags report the respective one of the different identification numbers to the interrogator, which includes each of the one of more tags: seeding the respective random number generator with the respective one of the different identification numbers to generate a first random number, determining a first time period to transmit the respective one of the different identification numbers as a function of the first random number, failing to properly transmit the respective one of the different identification numbers to the interrogator during the first time period, seeding the respective random number generator with the first random number to provide a second random number, and determining a second time period to transmit the respective one of the unique identification numbers to the interrogator as a function of the second random number.

Yet another embodiment includes operating several RF tags each having a respective one of a number of different identifiers that are unique relative to one another. This embodiment further includes broadcasting a first tag report command with an RF tag interrogator to a subset of the tags within communication range of the interrogator. This first command corresponds to a maximum quantity of tag response time slots and the subset includes more of the RF tags than the maximum quantity of such time slots. For each of the RF tags belonging to the subset, a respective one of the time slots is selected as a function of the parameter and a random number, and the respective one of the different identifiers is transmitted to the interrogator during the respective one of the time slots. With the interrogator, a communication collision is detected for at least one of the time slots, and one or more of the different identifiers are stored that correspond to one or more other of the time slots. In response to a second tag report command sent by the interrogator, the respective one of the different identifiers is transmitted to the interrogator from at least one of the RF tags that caused the collision.

A further embodiment of the present application includes: operating a number of RF tags included in an RF tag set that each have a respective one of a set of different identifiers. The set of different identifiers are effective to uniquely identify up to a maximum tag quantity in the RF tag set. This embodiment further includes broadcasting information to a subset of the RF tags from an RF tag interrogator. The subset is defined by those RF tags that are within communication range of the interrogator. The information corresponds to a maximum quantity of tag response time slots which is less than the maximum tag quantity by at least one order of magnitude. Each respective one of the RF tags of the subset selects one of the time slots as a function of the information and a random number provided with the respective one of the tags. The different identifiers from at least a portion of the subset are transmitted to the interrogator.

Still a further embodiment of the present application includes: operating several RF tags each including a respective one of a number of different identifiers that are unique relative to one another, and broadcasting a command with an RF tag interrogator to a subset of the RF tags within communication range of the interrogator. This subset numbers two or more and includes more of the RF tags than a maximum quantity of time slots available for response. This embodiment further includes responding to the command with each of the RF tags of the subset by providing a respective random number, selecting one of the time slots as a function of the respective random number, and transmitting the respective one of the different identifiers during the one of the time slots. With the interrogator, a communication collision is detected causing failure of proper transmission to the interrogator of the respective one of the different identifiers by one or more of the RF tags of the subset, storing the respective one of the different identifiers transmitted without the failure for each of a remainder of the RF tags in the subset, and broadcasting a further command to the subset. The one or more tags causing the failure respond to the further command, and response to the further command by the remainder of the RF tags is suppressed.

Another embodiment includes: operating a number of RF tags included in an RF tag set, where these tags each include a respective one of a corresponding set of identifiers which is effective to uniquely identify up to a maximum tag quantity in the RF tag set. This embodiment further includes performing an interrogation with an RF tag interrogator to determine the respective one of the different identifiers of each of the RF tags in a subset that numbers two or more of the RF tags and is at least one order of magnitude less than the maximum tag quantity. Respective tags of the subset each respond by: waiting for a time period determined as a function of at least a current, randomly determined number and a delay period; detecting if a different tag of the subset is transmitting; if transmission by the different tag of the subset is detected, repeating the waiting with a another randomly determined number in place of the current randomly determined number and the detecting; and transmitting the respective one of the unique identifiers to the interrogator if the transmission by the different tag is not detected.

Still a further embodiment includes: RF communication circuitry operable to perform RF tag interrogation, and an RF interrogator processing subsystem coupled to the interrogation circuitry. This processing subsystem is operable to register a number of deployed RF tags within a communication range by performing a registration procedure. This procedure includes a tag report command to cause each of the deployed tags to transmit a unique identifier. This command includes one parameter corresponding to a maximum quantity of RF tag response time slots available and a different parameter corresponding to randomization of a selection of a respective one of the time slots by each of the deployed tags. The registration procedure is effective to determine if a communication collision occurred during one or more of the time slots in response to the tag report command and to store the unique identifier transmitted by each of the deployed RF tags during one or more other of the time slots for which the communication collision did not occur. The registration procedure is further effective to suppress response of one or more of the tags to a subsequent tag report command, when the unique identifier for the one or more tags has been successfully received by the processing subsystem in response to the tag report command.

Yet another embodiment of the present application is a system comprising: RF tag communication circuitry, and an RF tag processing subsystem coupled to the circuitry. This subsystem includes a random numbered generator and a unique identification number. In one form, the random number generator is seeded in accordance with information received through the RF tag communication circuitry. The processing subsystem for this form is effective to determine a time slot to transmit an identifier through the RF tag communication circuitry, where the identifier is unique relative to the quantity of deployed RF tags and the time slot is determined as a function of a random number provided by the random number generator and a parameter included in the information. This parameter corresponds to a maximum quantity of transmission time slots to respond to a command which is less than the quantity of deployed RF tags by at least one order of magnitude.

In another form, the processing subsystem includes logic responsive to one or more commands received through the communication circuitry to: seed the random number generator with a first seed corresponding to the unique identification number to generate a first random number, determine a first time as a function of the first random number to attempt transmission of the unique identification number, seed the random number generator with a second seed corresponding to the first random number to generate a second random number if the transmission at the first time fails to be properly performed, and determine a second time as a function of the second random number to attempt the transmission of the unique identification number.

Further embodiments, forms, benefits, aspects, features, and advantages of the present invention will be apparent from the following description.

DESCRIPTION OF THE SELECTED EMBODIMENTS

Figure 1:
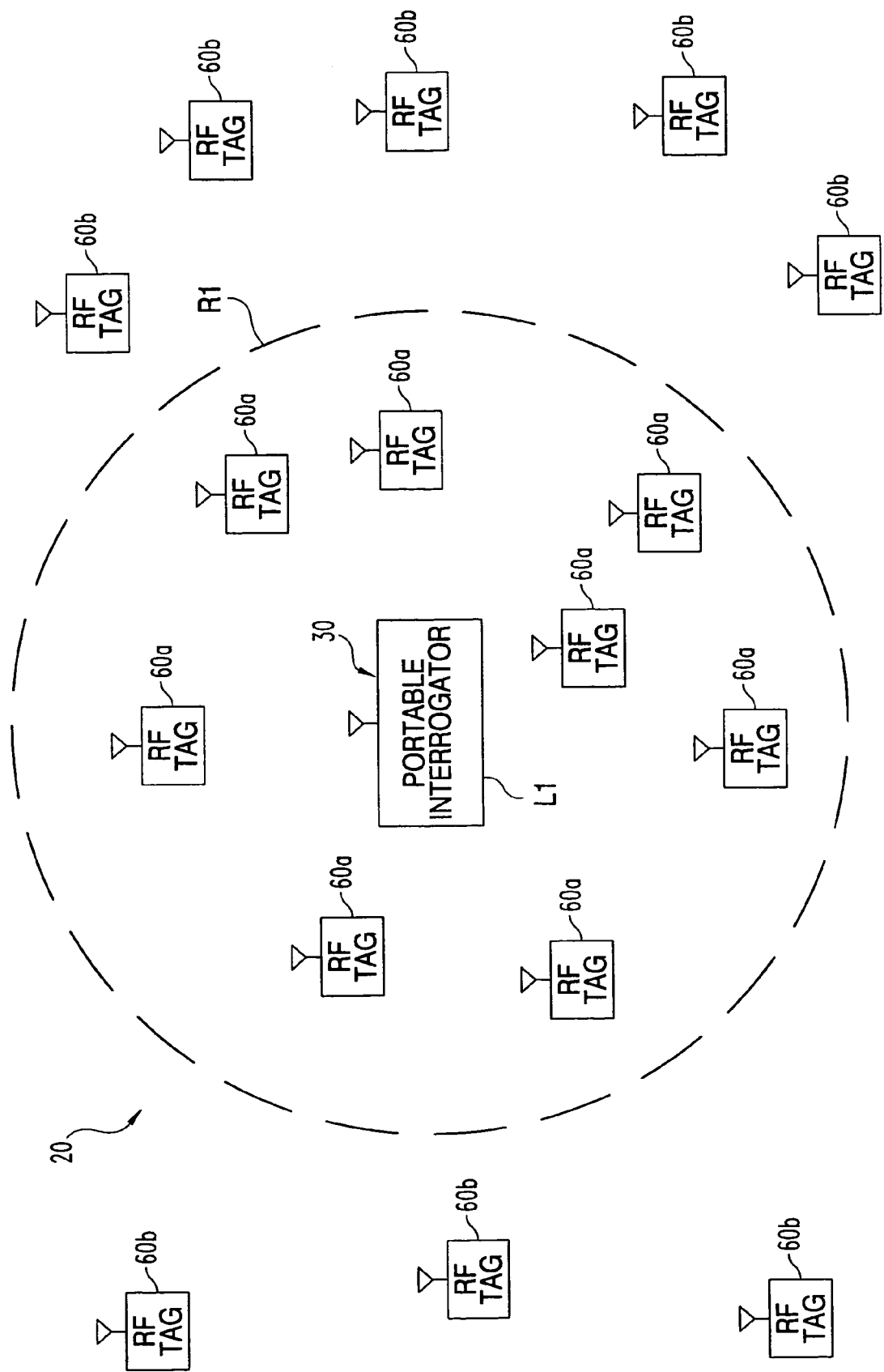
FIG. 1 is a diagrammatic view of a deployed RF communication system.

For the purposes of promoting an understanding of the principles of the inventions, reference will now be made to the embodiments illustrated in the drawings and specific language will be used to describe the same. It will nevertheless be understood that no limitation of the scope of the inventions is thereby intended. Any such alterations and further modifications of the principles of the inventions as illustrated or described herein are therein contemplated as would normally occur to one skilled in the art to which the inventions relate.

One embodiment of the present application includes operating several RF tags within communication range of an RF tag interrogator. These tags each include a respective random number generator and a respective identification number. Furthermore, the RF tags seed the respective random number generator with the respective identification number to generate a first random number and determine a first time period to transmit the identification number based on the first random number. The RF tags then seed the respective random number generator with the first random number to provide a second random number if transmission during the first time period fails to be properly performed. The RF tags then determine a second time period to transmit the respective unique identification number to the interrogator as a function of the second random number.

In another embodiment, the RF tags determine a first time period to transmit the identification number and then detect if a different RF tag is transmitting during that period. If such transmitting is detected, the RF tags determine a second time period to transmit the identification number and transmit such identification number if no other RF tag transmission is detected at that time. In yet another embodiment, a communication collision is detected for at least one of the time periods, while the identification numbers successfully transmitted from the RF tags during other time periods are stored by the interrogator. A suppression command is sent to the tags that successfully transmit in this regard. In response to a subsequent command broadcast by the interrogator, the respective identification number from at least one of the RF tags that caused the collision are transmitted to the interrogator, while response from those tags with a previous successful transmission are suppressed in accordance with the suppression command.

With reference to FIG. 1, further embodiments of the present application are described in connection with system 20. System 20 is arranged to provide for communication involving registration of RF tags. System 20 includes a portable RF tag interrogator 30 at a depicted location L1. From location L1, interrogator 30 has a communication range R1. Range R1 is generally circular in the schematic depiction of FIG. 1, having a center approximately coincident with interrogator 30. System 20 further includes RF tags 60a within communication range R1 of interrogator 30 and RF tags 60b outside communication range R1 of interrogator 30, as schematically represented in FIG. 1. Collectively, tags 60a and 60b are alternatively designated tags 60. It should be appreciated that R1 may be noncircular in other embodiments.

Figure 2:
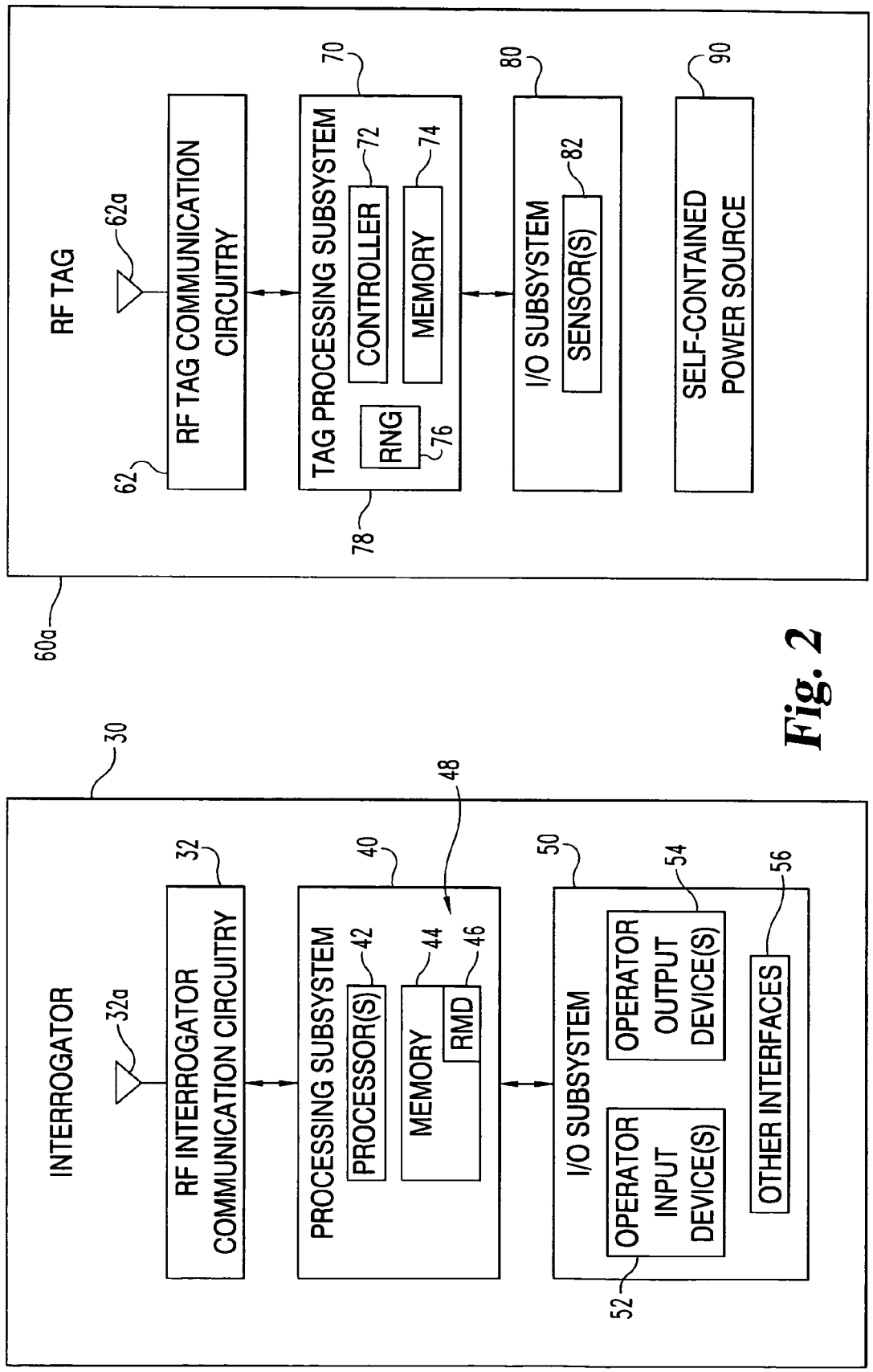
FIG. 2 is a diagrammatic view showing certain aspects of the RF tag and interrogator of FIG. 1 in greater detail.

With further reference to FIG. 2, additional details are described in connection with a representative interrogator 30 and RF tag 60a. Interrogator 30 includes RF communication circuitry 32, and RF antenna 32a coupled to circuitry 32 to bidirectionally communicate with RF tags 60a. Interrogator 30 further includes processing subsystem 40. Subsystem 40 includes one or more processors 42 and memory 44. Memory 44 can include a removable memory device (RMD) 46. Subsystem 40 further performs in accordance with operating logic 48. Additionally, interrogator 30 includes Input/Output (I/O) subsystem 50 including one or more operator input devices 52, one or more operator output devices 54, and other interfaces 56. In one embodiment, interfaces 56 enable wireless and/or wired connection to a computer network and/or host(s) (not shown). It should be appreciated that in other embodiments interrogator 30 may be in a fixed position, nonportable, and/or be comprised of multiple separate units. Alternatively or additionally, interrogator 30 may be provided with or without connection to a central host(s). In one portable, manually carriable form, interrogator 30 is a laptop personal computer, a Personal Digital Assistant (PDA) device, or other general purpose device adapted to operate as described hereinafter, including, an appropriate wireless communication subsystem. In an alternative embodiment, interrogator 30 is a dedicated, RF tag communication device.

Turning to RF tag 60a in FIG. 2, it should be understood that RF tags 60a and RF tags 60b are configured in a like manner, with the difference being that RF tags 60b are located outside of communication range R1, while RF tags 60a are within communication range R1. RF tag 60a includes RF tag communication circuitry 62, operable to bidirectionally communicate with interrogator 30, and RF antenna 62a coupled to circuitry 62 to enable such communication. RF tag 60a further includes tag processing subsystem 70. Subsystem 70 includes tag controller 72 and tag memory 74. Subsystem 70 performs in accordance with operating logic 78. Operating logic 78 can be configured to perform many functions, such as responding to commands from the interrogator 30, randomly selecting time slots, and/or detecting transmission of an identification number by a different RF tag. RF tag 60a includes tag I/O subsystem 80, which has one or more sensors 82. RF tag 60a further includes a self-contained power source 90. Power source 90 can be a battery power source, a solar power source, and/or a kinetic power source, to name some nonlimiting examples.

Interrogator processing subsystem 40 and tag processing subsystem 70 process signals and data associated with system 20. Communication circuitry 32 and 62 are each responsive to signals from processing subsystems 40 and 70, respectively, to provide corresponding signals via antennas 32a and 62a, respectively. In one embodiment, at least one of circuitry 32 and processor 42, and at least one of circuitry 62 and controller 72, include one or more digital-to-analog converters (DAC) and one or more analog-to-digital converters (ADC) to facilitate digital data processing. Processing subsystem 40 selectively provides output to operator output device 54 and selectively responds to input from operator input device 52. Further, processing subsystem 70 selectively provides output to and responds to input from I/O subsystem 80.

Memory 44 and memory 74 are illustrated in association with processor 42 and controller 72, respectively; however, memory 44 and/or memory 74 can be separate from or at least partially included in processor 42 and/or controller 72. Memory 44 and/or memory 74 can be of a solid-state variety, electromagnetic variety, optical variety, or a combination of these forms. Furthermore, memory 44, 74 can be volatile, nonvolatile, or a mixture of these types. Memory 44, 74 can be at least partially integrated with respective circuitry 32, 62, and/or processor 42, controller 72; respectively. RMD 46a can be a floppy disc, cartridge, or tape form of removable electromagnetic recording media; an optical disc, such as a CD or DVD type; an electrically reprogrammable solid-state type of nonvolatile memory, and/or such different variety as would occur to those skilled in the art. In still other embodiments, RMD 46a is absent.

Circuitry 32 and processor 42, as well as circuitry 62 and controller 72, can be comprised of one or more components of any type suitable to operate as described herein. Further, it should be appreciated that all or any portion of circuitry 32 and processor 42, as well as circuitry 62 and controller 72, can be integrated together in a common device, and/or provided as multiple processing units, respectively. For a multiple processing unit form of processor 42 and/or controller 72; distributed, pipelined, and/or parallel processing can be utilized as appropriate. In one embodiment, circuitry 32 is provided as one or more components coupled to a dedicated RF communication integrated circuit; processor 42 is provided in the form of one or more general purpose central processing units that interface with other subsystems in interrogator 30 over a standard bus connection; and memory 44 includes dedicated memory circuitry integrated within processor 42, and one or more external memory components including a removable disk form of RMD 46a. Circuitry 32 and/or processor 42, as well as circuitry 62 and/or controller 72, can include one or more signal filters, limiters, oscillators, format converters (such as DACs or ADCs), power supplies, or other signal operators or conditioners as appropriate to operate system 20 in the manner to be described in greater detail hereinafter.

Operator input device 52 can include an alphanumeric keyboard, mouse, and/or other pointing device of a standard variety. Alternatively or additionally, one or more other input devices can be utilized, such as a voice input subsystem or a different type as would occur to those skilled in the art. Operator output device 54 can be of a Cathode Ray Tube (CRT) type, Liquid Crystal Display (LCD) type, plasma type, Organic Light Emitting Diode (OLED) type, or such different type as would occur to those skilled in the art. Alternatively or additionally, one or more other operator output devices can be utilized, such as a printer, one or more loudspeakers, headphones, or such different type as would occur to those skilled in the art. Subsystem 50 also can include one or more communication interfaces suitable for connection to a computer network, such as a Local Area Network (LAN), Municipal Area Network (MAN), and/or Wide Area Network (WAN) like the internet; a PDA device; and/or a dedicated wireless or hardwired connection to one or more other devices.

Logic 78 of each tag 60 is effective to provide a Random Number Generator (RNG) 76, which is schematically depicted in FIG. 2. RNG 76 can be of a standard pseudorandom type that is digitally generated, and/or of a true random type based on a random noise source (such as popcorn noise) or the like. Logic 78 of each tag 60 also defines an identifier in the form of an identification number, that is included in subsystem 70. The number of possible unique identifiers provided by the selected identifier format constitutes a "tag identification space." Generally, the number of uniquely identifiable tags (ND) is limited by the identifier format to a finite, maximum quantity. For example, an identifier expressed in a binary form of 16 bits is limited to $ND=2^{16}=64K$ (65,536 base ten) unique identifying numbers.

Processor 42 and controller 72 can be of a programmable type; a dedicated, hardwired state machine; or a combination of these. Processor 42 and controller 72 perform in accordance with operating logic 48 and operating logic 78, respectively, that can be defined by software programming instructions, firmware, a neural network or other adaptive logic engine, dedicated hardware, a combination of these, or in a different manner as would occur to those skilled in the art. For a programmable form of processor 42 or controller 72, at least a portion of operating logic 48, 78 can be defined by instructions stored in memory 44, 74; respectively. Additionally or alternatively, logic 48 can be carried on RMD 46a and/or carried in the form of one or more signals carried by one or more parts/pathways of a computer network (not shown). Subsystem 70 can also include a removable memory (not shown) and/or be connected to a communication network (also not shown) that carries some or all of logic 78. Programming of processor 42 and controller 72 can be of a standard, static type; an adaptive type provided by neural networking, expert-assisted learning, fuzzy logic, or the like; or a combination of these.

Figure 3:
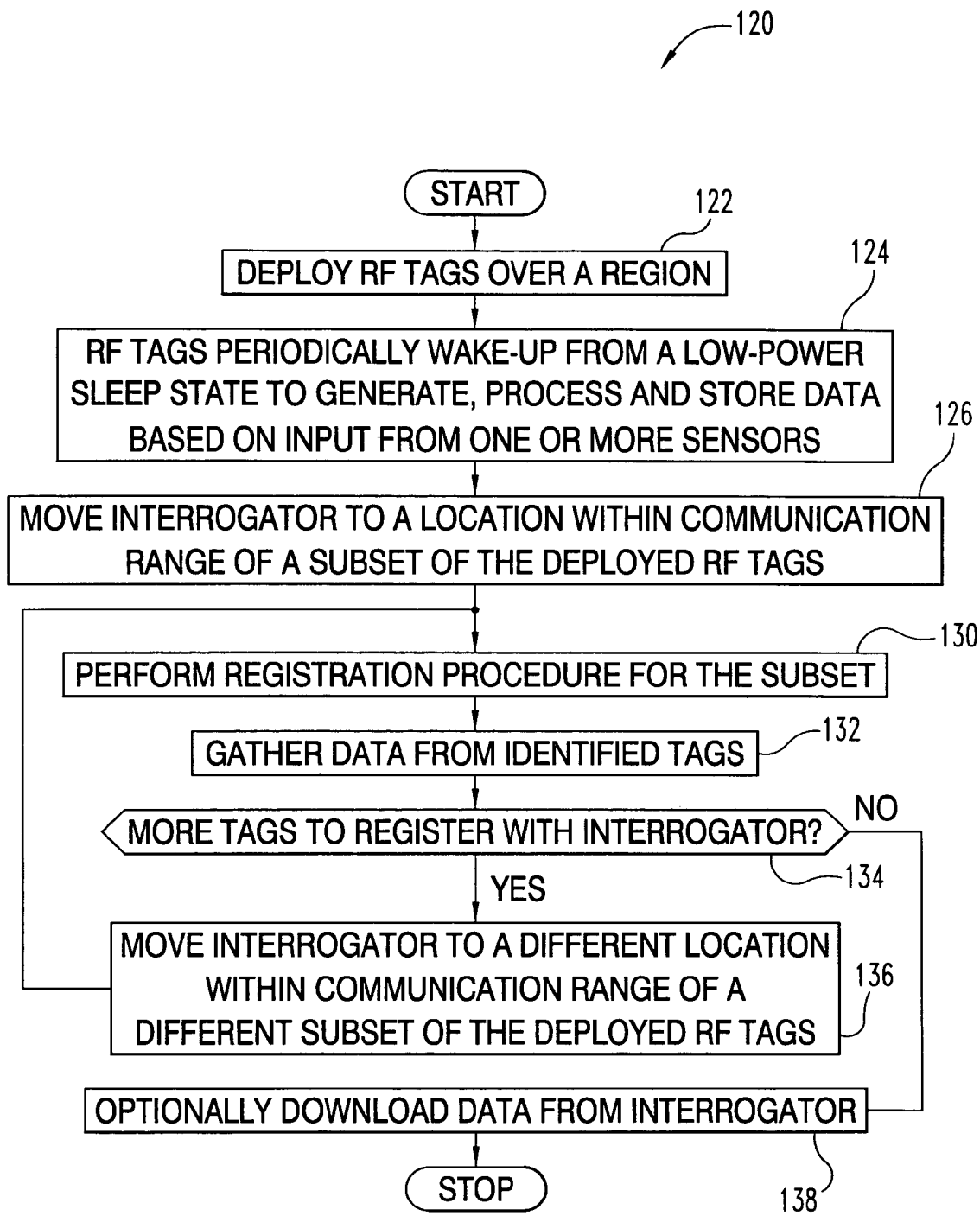
FIG. 3 depicts a flowchart of one routine performed with the system of FIG. 1.

FIG. 3 illustrates procedure 120 that can be implemented with system 20 including corresponding configurations of logic 48 and 78. Procedure 120 is described in operation stages, as depicted in FIG. 3. In operation 122 of procedure 120, RF tags 60a and 60b are deployed over a region. In operation 124, RF tags 60a and 60b periodically wake-up from a low-power, sleep state to generate, process and store data based on input from one or more sensors 82. In this manner, power can be conserved relative to an RF tag that is continuously active. In operation 126, interrogator 30 is moved to a location within communication range of a subset of the deployed RF tags. For example, interrogator 30 is placed at location L1 with communication range R1, as illustrated in FIG. 1. Accordingly, RF tags 60a are a subset of deployed RF tags 60, with a quantity designated as NR. In one preferred embodiment, the subset NR is at least one order of magnitude less than a maximum quantity of uniquely identifiable tags ND made possible by the number of unique identities that can be assigned. In a more preferred embodiment, subset NR is at least two orders of magnitude less than the maximum quantity of uniquely identifiable tags ND. In a still more preferred embodiment, subset NR is more than three orders of magnitude less than the maximum quantity of uniquely identifiable tags ND.

Figure 4A:
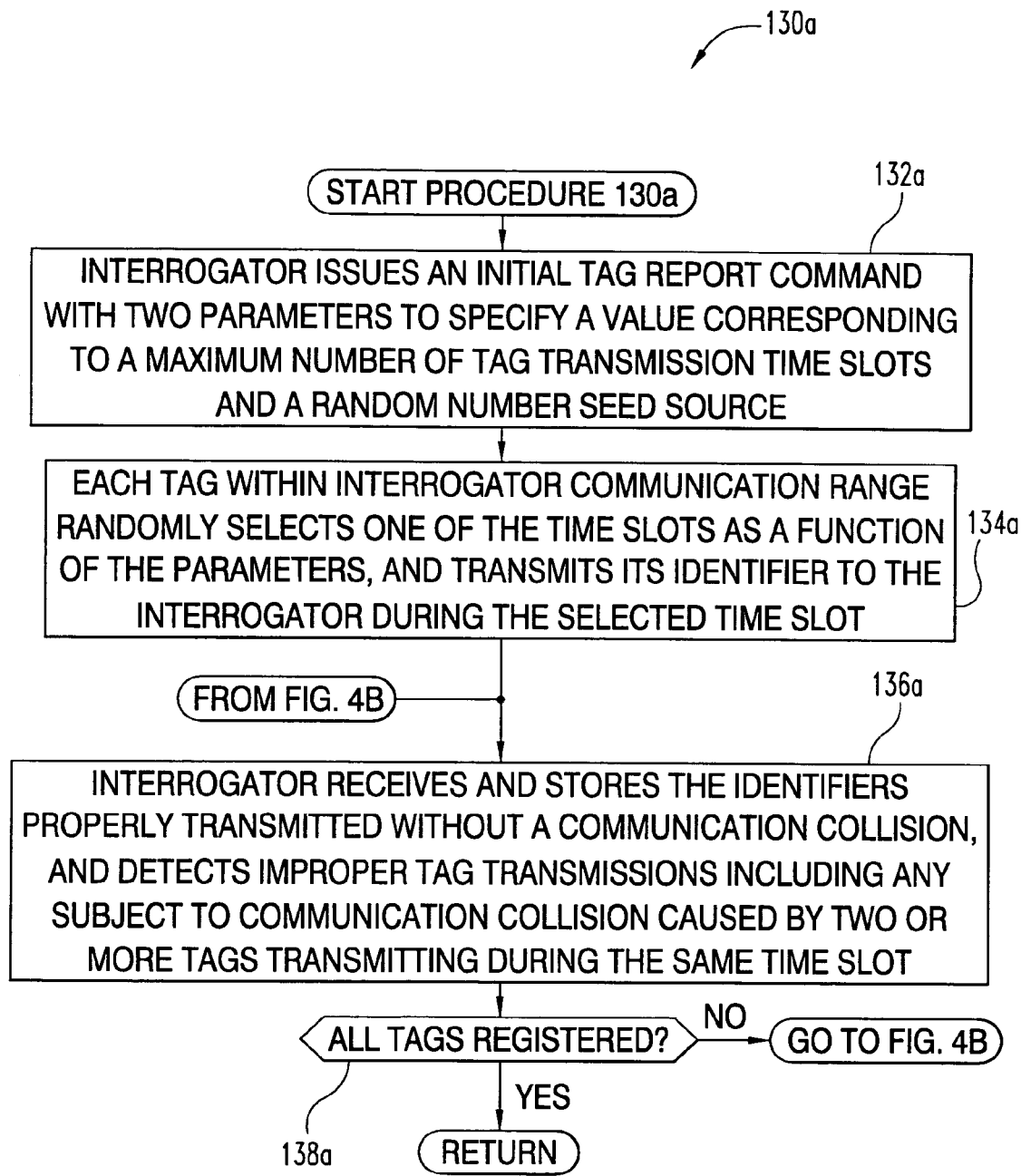
FIGS. 4A and 4B depict a flowchart of one type of a registration procedure that can be performed during the routine of FIG. 3 with the system of FIG. 1.
Figure 4B:
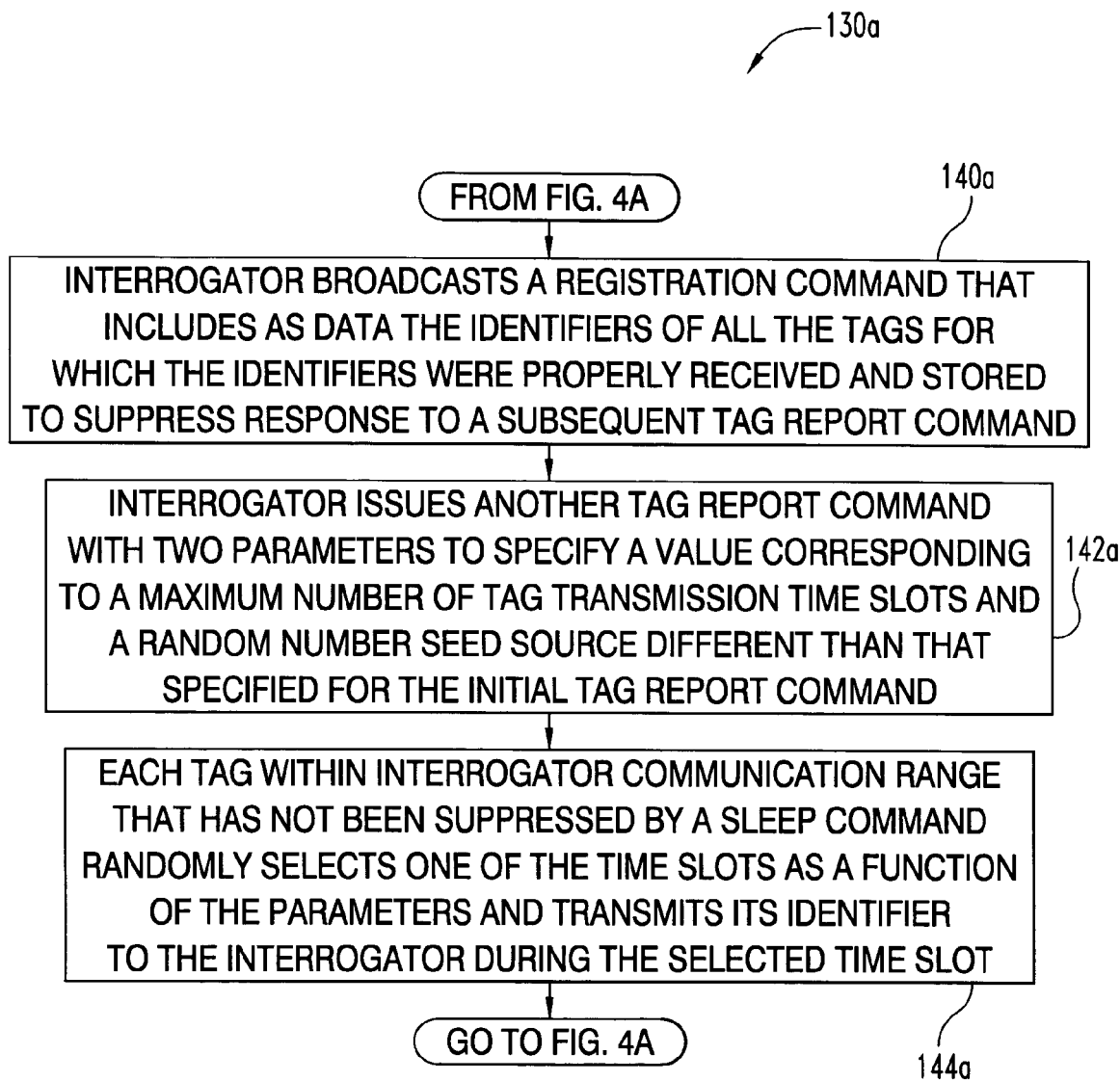
Figure 5:
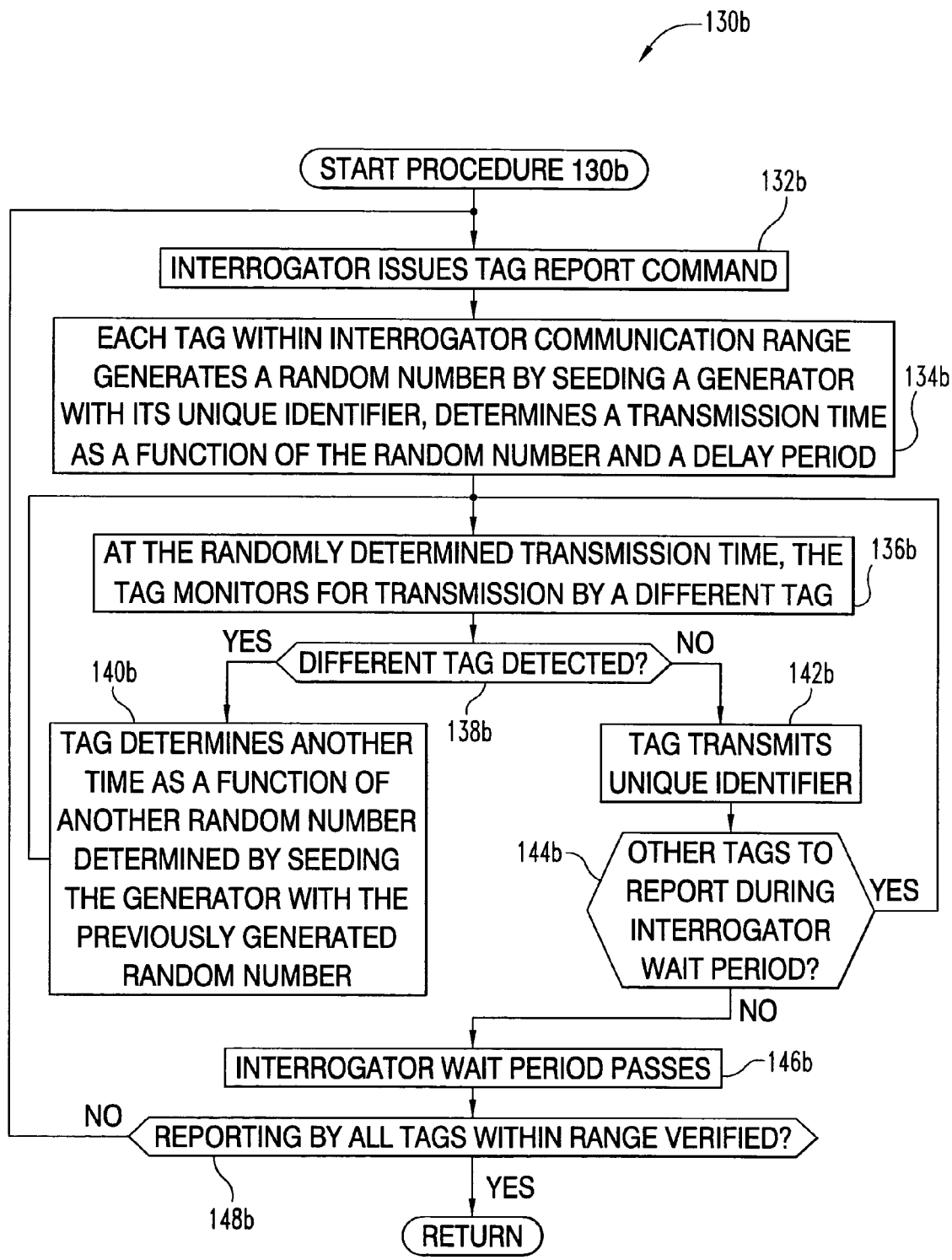
FIG. 5 depicts a flowchart of another type of a registration procedure that can be performed during the routine of FIG. 3 with the system of FIG. 1.

From operation 126, procedure 120 continues with registration procedure 130 to register the tag subset with interrogator 30. FIGS. 4A and 4B depict one form of such a tag registration procedure designated generally by reference numeral 130a. FIG. 5 illustrates another form as tag registration procedure 130b. Procedures 130a and 130b are just two nonlimiting examples of registration procedure 130 that can be implemented with system 20, adapting logic 48, 78 accordingly.

Referring specifically to FIG. 4A, tag registration procedure 130a begins with operation 132a. In operation 132a of procedure 130a, interrogator 30 issues an initial tag report command with two parameters: a time slot parameter (I) and a random number generator seed source parameter (RS). The time slot parameter I defines a value corresponding to a maximum number of available tag transmission time slots (NS) (tags 60 are each configured to determine NS from I) and the seed source parameter designates at least one of two sources of a pseudorandom number generator seed source. Accordingly, for this embodiment, RNG 76 of each tag 60 is of a pseudorandom type for which each random number output is typically based on a seed input number. One common form of this type of random number generator is provided in sequential logic terms as a shift register with associated combinational logic gates connected to register output(s). In turn, an output of this combinational logic is fed back into the register. Naturally, in other embodiments a different type of pseudorandom number generation and/or a non-pseudorandom type of generator can be utilized.

Further, for this embodiment, each tag 60a response to the tag report command takes a maximum time period, designated as transmission window TW. After generating the tag report command, interrogator 30 listens for tag responses for a period of time (PT) that corresponds to a sequence of tag response time slots NS that each are of at least TW in duration (PT=NS*TW). However, the number of time slots NS is typically much less than the maximum quantity of uniquely identifiable tags ND that is permitted by the tag identifier format.

The seed source parameter RS of the tag report command initially directs each tag 60a within range of interrogator 30 to use its unique identifier as the seed for random number generation in operation 134a (for example, RS=0). For this embodiment, the selection of the tag's unique identifier as the seed source causes a tag status change from registered to unregistered. Based on this seed, the resulting random number (RN1) is used to select one of the available tag transmission time slots NS. As part of this selection, the time slot parameter I is used by each tag 60a to determine NS. Specifically, I is an integer representative of the number of tags that may transmit in any sequential time slot period TW. Given that logic 78 of each tag 60a includes the finite maximum quantity of uniquely identifiable tags ND. As a result, the number of available slots NS can be determined with logic 78 of each tag 60a as: NS=ND/I. Correspondingly, the random number RN1 generated with RNG 76 of each tag 60a by seeding with its identifier, is confined to an integer in the range from 1 to ND. To complete the selection, each tag 60a divides the random number RN1 by the integer value I to randomly select a time slot TS1 (TS1=RN1/I). To determine how long to wait (delay) transmission in correspondence to the selected time slot TS1, time slot TS1 is multiplied by transmission window TW, such that the transmission delay TD1 is given by: TD1=TW*TS1. As one nonlimiting example, let TW=2 milliseconds (ms), ND=64K=$2^{16}$=65,535 (base 10), I=10, and RN1=20. Using the above calculations, the RF tag would attempt to report its identification number in the second time slot, such that: TS1=RN1/I=20/10=2. Multiplying TS1 by TW results in a delay of 4 ms (TS1×TW=2×2 ms=4 ms).

Under certain circumstances, the RF tags 60a NR within interrogator communication range can number more than the maximum number of available tag transmission time slots NS which can result in communication collision during one or more of time slots NS (NR>NS). From operation 134a, procedure 130a continues with operation 136a where interrogator 30 receives and stores the identifiers each properly transmitted by a different tag 60a in a time slot without a communication collision, and detects improper tag transmissions including any subject to a communication collision caused by two or more tags 60a transmitting during the same time slot. From operation 136a, procedure 130a continues with conditional 138a which tests whether all tags are registered. This test can be implemented by interrogator 30 waiting for time period PT (PT=NS*TW) with no further tag transmission detected. If all RF tags are not registered, procedure 130a continues to operation 140a depicted in FIG. 4B. Otherwise, procedure 130a returns to procedure 120.

Referring to FIG. 4B, in operation 140a, interrogator 30 broadcasts a "registered" or equivalently a suppression command that includes as data the identifiers of any tags 60a for which the identifiers were properly received and stored in response to the previous (most recent) tag report command in operation 134a. This command identifies such tags 60a by identifier, and causes these tags 60a to ignore subsequent tag report commands by changing their state to "registered," or equivalently operates to suppress response to subsequent report commands until the registration state is reset to "unregistered" again by selection of the tag's unique identifier as the seed source in a report command (see operation 134a). Naturally, "registered" tags 60a (tags 60a with a registered state or status) can be receptive to other commands as appropriate to the application.

From operation 140a, procedure 130a continues with operation 142a in which interrogator 30 issues another tag report command with the same two types of parameters (I and RS) to specify a value corresponding to a maximum number of tag transmission time slots NS and a random number seed source, respectively. For this subsequent report command of procedure 130a, the seed source parameter RS directs seeding by a different source than the first (initial) tag report command. For example, in one embodiment, RS=1 directs that the seed be the most recently generated random number provided by RNG 76 for a given tag 60a.

In operation 144a, each tag 60a within interrogator communication range that has not been suppressed by a registered command randomly selects one of the time slots NS as a function of the parameters I and RS. Specifically, using the different seed source, another random number RN2 is generated that is constrained to the 1 to ND integer range. This subsequent random number RN2 is used to determine another time slot TS2 (TS2=RN2/I). Correspondingly, another transmission delay TD2 is determined (TD2=TS2*TW), after which the respective tag 60a transmits its identifier to the interrogator (during the selected time slot TS2). In other words, for this embodiment, after initially seeding with its identifier, each unsuppressed RF tag 60a seeds the random number generator with the most recently generated random number to receive another random number. For this embodiment, the random number generator is designed to randomize selection of an integer spread over the 1 to ND range for any values used as seed that are included in a relatively short (defined by the number of values I in a given time slot) sequential set of numbers in the 1 to ND range. Generally, it is undesirable to use as seed a set of values that cause consecutive selection of the same time slot. In other embodiments, random number generation may be performed differently as desired for the particular application.

From operation 144a, procedure 130a loops back to operation 136a depicted in FIG. 4A, repeating it and conditional 138a. Depending on the test of conditional 138a, procedure 130a proceeds to operation 140a or returns. With the execution of operation 140a, those tags 60a for which interrogator 30 successfully receives/stores the corresponding identifiers are sent a registration command to suppress response to a subsequent tag report command. Further, with each execution "j" of operation 142a and 144a in this manner, the most recent random number generated by each tag that is not suppressed seeds generation of a new random number (RN3, RN4, . . . , RNj); where "j" is an integer execution counter. This new random number is utilized to randomly select still another transmission time slot (TS3, TS4, . . . , TSx). Accordingly, when procedure 130a returns, all RF tags are registered by procedure 130a, and procedure 120 continues with operation 132, as depicted in FIG. 3, and further described hereinafter.

With reference to FIG. 5, another tag registration procedure 130b is illustrated and described in operation stages that can be used to implement operation 130 of procedure 120. In operation 132b of procedure 130b, interrogator 30 issues a tag report command; however, this command may not include one or more parameters as described to procedure 130a. In operation 134b, each tag 60a within interrogator communication range generates a random number (RN1) by seeding a generator with its unique identifier, and determines a transmission time (TT1) as a function of random number RN1 and a preset delay period (DP). For this embodiment, RNG 76 is in the form of a pseudorandom type. Typically, all RF tags 60*a* within interrogator communication range number more than the maximum number of tag transmission time slots NS that are available, as may also occur during procedure 130*a*. For operation 134*b*, the generated random number RN1 is constrained to a value that is no more than the maximum number of uniquely identifiable tags in the tag space ND. Further, random number constraints include return of an integer only in the 1 through ND range as in the case of procedure 130*a*. Accordingly, TT1=RN1*DP.

Procedure 130*b* continues with operation 136*b*. In operation 136*b*, a respective RF tag 60*a* listens or monitors at the beginning of its respective, randomly determined transmission time TT1 for ongoing transmission by a different tag 60*a*. From operation 136*b*, procedure 130*b* proceeds to conditional 138*b*. Conditional 138*b* tests whether transmission by a different RF tag has been detected per the operating logic 78 of the respective RF tag 60*a*. If transmission by a different RF tag 60*a* is detected, procedure 130*b* continues with operation 140*b*. In operation 140*b*, the respective RF tag 60*a* determines another transmission time TT2 as a function of another random number (RN2) determined by seeding the generator with the previously generated random number RN1. In other words, the RF tag proceeds by seeding the random number generator with the first random number RN1 to receive a second random number RN2, and thus determines another transmission time TT2 which is a function of the second random number RN2 received. In contrast to procedure 130*a*, this reseeding is initiated by logic 78 of the respective RF tag 60*a* instead of a subsequent tag report command. Thereafter, procedure 130*b* loops back to operation 136*b*. This loop, including operation 136*b*, conditional 138*b*, and operator 140*b*, is repeated until the test of conditional 138*b* is negative, using the previous random number to seed generation of the next in operation 140*b*. If the test of conditional 138*b* is negative, procedure 130*b* continues to operation 142*b* where the respective RF tag 60*a* transmits its unique identifier to interrogator 30.

From operation 142*b*, procedure 130*b* continues with conditional 144*b*, which tests whether there are other RF tags 60*a* to report during an interrogator wait period WP. Wait period WP is the preset delay period DP multiplied by the maximum random number value ND (WP=DP*ND). If other RF tags 60*a* report during the interrogator wait period WP, procedure 130*b* loops back to operation 136*b* and continues again through operation 136*b* and conditional 138*b*. If the test of conditional 144*b* is negative, such that there are no other RF tags 60*a* to report during the interrogator wait period WP, procedure 130*b* continues to operation 146*b*, which is representative of the passage of the wait period WP. From operation 146*b*, procedure 130*b* continues to conditional 148*b* to test whether reporting by all RF tags 60*a* within the range has been verified. If this test is negative, procedure 130*b* loops back to operation 132*b* and continues again through the operations and conditions 132*b*-148*b*, as appropriate. If the test of conditional 148*b* is affirmative, procedure 130*b* returns to procedure 120.

It was found by experimental simulation for one form of tag 60 that a delay period DP of 650 microseconds between tag responses resulted in no communication collisions between RF tags 60*a* for ND=64K=65,535. However, with 64K possible tags, this results in a wait period WP of 42.6 seconds, which is determined by multiplying 64K tags by 650 microseconds (WP=DP*ND=65,535*650 µs=42.6 s). Thus, interrogator 30 waits 42.6 seconds after receiving the transmission from the last RF tag 60*a* to report before determining that no more tags 60*a* are left. Notably, this terminal wait period WP does not include the time it took for all the reporting tags 60*a* to successfully transmit to interrogator 30.

For situations where the quantity NR of tags 60*a* within range of interrogator 30 is less than ND, there is a potential to reduce this maximum delay. By reducing delay period DP to 100 microseconds, wait period WP is reduced to about 6.55 seconds. Thus, the time required for interrogator 30 to verify that all the RF tags 60*a* have transmitted the respective identification numbers is reduced from about 42.6 seconds to about 6.55 seconds. Based on experimental simulation with the same parameters as the DP=650 µs simulation, simulation with DP=100 µs and ND=64K resulted in an average time to identify RN=20 tags of about 8.7 seconds, including the terminal wait period WP=6.55 second. This 20 tag simulation resulted in 99.5% good transmissions, using a second pass (tag report command) to verify all tags were identified. In another simulation for NR=200 tags and ND=64K, the average time to identify all 200 tags was about 47.8 seconds (also including WP=6.55 s) with an average of three passes and 92.1% good transmissions. Thus, while reducing delay period DP may increase the likelihood of collisions, the total time to identify all tags 60*a*, even with multiple interrogator passes, will generally still be less than implementing one interrogator pass with a delay period of 650 microseconds. It should be appreciated that for other tag configurations, different quantities of tags 60*a* within communication range of interrogator 30, and/or different delay periods DP, a different reduction in overall reporting time can be realized relative to the upper limit of DP*ND.

Returning to FIG. 3, procedure 120 continues with operation 132. In operation 132, data is gathered from identified tags 60*a*. Such data may include geographic location, environmental, diagnostic, prognostic, status, or different information, determined with or without sensor 82 input. From operation 132, procedure 120 continues with conditional 134 inquiring if there are more tags 60 to register with interrogator 30 in a different communication range. If the test of conditional 132 is affirmative, procedure 120 continues with operation 136. In operation 136, interrogator 30 is moved to a different location within communication range of a different subset of deployed RF tags 60. Thereafter, procedure 120 loops back to registration procedure 130, executing it again, followed by operation 132 and conditional 134. If the test of conditional 134 is negative, procedure 120 proceeds to operation 138, in which data gathered from the identified RF tags 60 is optionally downloaded from interrogator 30.

In other embodiments, a different form of registration procedure 130 may be utilized in addition or as an alternative to procedure 130*a* or procedure 130*b*. Furthermore, features of procedure 130*a* and/or 130*b* can be interchanged, eliminated, modified, or combined in still other embodiments. For example, the time slot parameter of procedure 130*a* can be made to vary between some or all tag report commands and/or parameter I may directly provide NS or be provided in a different from which available time slot information (such as NS) can be obtained. In another example, the manner of seeding or otherwise generating random numbers can vary between some or all interrogator commands (passes)—either in response to interrogator-transmitted information or independent therefrom for procedure 130*a* and/or 130*b*. In yet another example, the delay period (DP) of procedure 130*b* can be made to vary between some or all transmission attempts by a given tag and/or between some or all tag report commands.

In one embodiment, routine 120 is particularly suited to operation in military applications subject to Hazards of Electromagnetic Radiation to Ordnance (HERO) requirements. HERO requirements are directed to reducing accidental actuation of explosive devices (or ordnance) due to wireless RF energy transmissions. Procedures 130a, 130b, and variations thereof are especially useful when the quantity of tags within range of an interrogator is much less than the maximum tag quantity that are uniquely identifiable by the identifier format shared in common (NR<<ND). This situation is commonly desired for HERO situations.

All publications and patent applications cited in this specification are herein incorporated by reference as if each individual publication or patent application were specifically and individually indicated to be incorporated by reference. Further, any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications to the inventions as described herein or by the following claims are desired to be protected.

What is claimed:

1. A method, comprising: operating several RF tags within communication range of an RF tag interrogator, the RF tags each including a respective random number generator and a respective one of a several different identification numbers, the different identification numbers each being unique relative to one another, one or more of the RF tags reporting the respective one of the different identification numbers to the interrogator, said reporting including the one or more of the RF tags each:
   seeding the respective random number generator with the respective one of the different identification numbers to generate a first random number;
   determining a first time period to transmit the respective one of the different identification numbers as a function of the first random number;
   determining that the respective one of the different identification numbers was not properly transmitted to the interrogator during the first time period;
   seeding the respective random number generator with the first random number to provide a second random number; and
   determining a second time period to transmit the respective one of the unique identification numbers to the interrogator as a function of the second random number.

2. The method of claim 1, which includes seeding the respective random number generator with the second random number after said determining the second time period.

3. The method of claim 1, wherein the respective random number generator is a pseudorandom type.

4. The method of claim 1, wherein:
   the several RF tags belong to an RF tag set;
   the several different identification numbers belong to a corresponding identifier set, the identifier set being effective to unique identify up to a maximum tag quantity in the RF tag set; and
   the several RF tags number at least one order of magnitude less than the maximum tag quantity.

5. The method of claim 1, wherein:
   said seeding the respective random number generator with the respective one of the different identification numbers is performed in response to a first tag identifier report command broadcast by the interrogator; and
   said seeding the respective random number generator with the first random number is performed in response to a second tag identifier report command broadcast by the interrogator.

6. The method of claim 5, which includes broadcasting a suppression command with the interrogator to suppress response of a subset of the RF tags to the second tag identifier report command.

7. The method of claim 1, wherein:
   said determining that the respective one of the different identification numbers was not properly transmitted includes the one or more of the RF tags each detecting the transmission of one or more other of the RF tags before transmitting the respective one of the different identification numbers during the first time; and
   performing said seeding the respective random number generator with the first random number in response to said detecting.

8. The method of claim 1, wherein said determining that the respective one of the different identification numbers was not properly transmitted is a result of a communication collision during the first time.

9. A method, comprising:
   operating several RF tags each including a respective one of a number of different identifiers, the different identifiers being unique relative to one another;
   broadcasting a first tag report command with an RF tag interrogator to a subset of the RF tags, the subset being the RF tags within communication range of the interrogator, the first tag report command including a parameter corresponding to a maximum quantity of tag response time slots, the subset including more of the RF tags than the maximum quantity of tag response time slots;
   for each of the RF tags belonging to the subset, selecting a respective one of the time slots as a function of the parameter and a random number, and transmitting the respective one of the different identifiers to the interrogator during the respective one of the time slots;
   with the interrogator, detecting a communication collision for at least one of the time slots and storing one or more of the different identifiers transmitted from the subset during one or more other of the time slots; and
   in response to a second tag report command sent by the interrogator;
   transmitting the respective one of the different identifiers to the interrogator from at least one of the RF tags that caused the collision.

10. The method of claim 9, wherein the function of the parameter and the random number further is performed in accordance with a maximum quantity of uniquely identifiable tags, the subset of the RF tags numbering at least one order of magnitude less than the maximum quantity.

11. The method of claim 9, which includes for each of the RF tags belonging to the subset:
   generating the random number with a random number generator, and
   seeding the random number generator with the respective one of the different identifiers in response to the first command.

12. The method of claim 9, which includes broadcasting a suppression command with the interrogator after said broadcasting the first command and before said transmitting, the suppression command suppressing a response to the second command by each of the RF tags belonging to the subset for which the interrogator stored the respective one of the different identifiers.

13. The method of claim 9, which includes:
performing the first command and the second command with the interrogator at a first location;
moving the interrogator from the first location to a second location;
interrogating a different subset of the RF tags with the interrogator after said moving, the different subset including a number of RF tags not included in the subset; and
transmitting the respective one of the different identifiers for each of the number of RF tags of the different subset in response to said interrogating.

14. A method, comprising:
operating a number of RF tags included in an RF tag set, the RF tags each including a respective one of a set of different identifiers, the set of different identifiers being effective to uniquely identify up to a maximum tag quantity in the RF tag set;
broadcasting information to a subset of the RF tags from an RF tag interrogator, the subset being the RF tags within communication range of the interrogator, the information corresponding to a maximum quantity of tag response time slots, the maximum quantity being at least one order of magnitude less than the maximum tag quantity;
each respective one of the RF tags of the subset selecting one of the time slots as a function of the information and a random number provided with the respective one of the RF tags of the subset; and
transmitting the different identifiers from at least a portion of the subset to the interrogator.

15. The method of claim 14, wherein the maximum quantity is at least two orders of magnitude less than the maximum tag quantity, and the subset of the RF tags numbers at least two orders of magnitude less than the maximum tag quantity, and further comprising:
performing said broadcasting of the information with the interrogator at a first location;
moving the interrogator from the first location to a second location;
interrogating a different subset of the RF tags with the interrogator after said moving, the different subset including one or more of the RF tags not included in the subset; and
transmitting the respective one of the different identifiers for each of the one or more of the RF tags of the different subset in response to said interrogating.

16. The method of claim 14, which includes in response to said broadcasting each respective tag of the subset generating the random number with a respective random number generator seeded with the respective one of the different identifiers.

17. The method of claim 16, wherein said broadcasting the information is in the form of a command, and further comprising:
broadcasting a further command with the interrogator to suppress a response to a subsequent command by a plurality of the RF tags of the subset for which the interrogator has stored the respective one of the different identifiers; and
broadcasting the subsequent command with the interrogator to which one or more of the RF tags of the subset responds, the plurality of the RF tags of the subset being nonresponsive to the subsequent command based on the further command.

18. The method of claim 17, which includes for each of the one or more of the RF tags of the subset, generating another random number by seeding the respective random number generator with the random number in response to the subsequent command.

19. A method, comprising:
operating several RF tags each including a respective one of a number of different identifiers, the different identifiers being unique relative to one another;
broadcasting a command with an RF tag interrogator to a subset of the RF tags, the subset being the RF tags within communication range of the interrogator, the subset numbering two or more of the RF tags and numbering more of the RF tags than a maximum quantity of time slots available for each of the RF tags to respond to the command;
responding to the command with each of the RF tags of the subset: providing a respective random number, selecting one of the time slots as a function of the respective random number, and transmitting the respective one of the different identifiers during the one of the time slots;
with the interrogator, detecting a communication collision causing failure of proper transmission to the interrogator of the respective one of the different identifiers by one or more of the RF tags of the subset and storing the respective one of the different identifiers transmitted without the failure for each of a remainder of the RF tags in the subset;
broadcasting a further command to the subset;
responding to the further command with the one or more of the RF tags causing the failure; and
suppressing response to the further command by the remainder of the RF tags of the subset.

20. The method of claim 19, which includes:
performing said broadcasting of the command and said broadcasting of the further command, with the interrogator at a first location;
moving the interrogator from the first location to a second location;
interrogating a different subset of the RF tags with the interrogator after said moving, the different subset including at least one of the RF tags not included in the subset; and
transmitting the respective one of the different identifiers for each of the at least one of the RF tags of the different subset in response to said interrogating the different subset.

21. The method of claim 19, which includes in response to the command, generating the respective random number with a random number generator seeded with the respective one of the different identifiers for each of the RF tags of the subset.

22. The method of claim 19, wherein said suppressing includes broadcasting a suppression command between after said broadcasting the command and before said broadcasting the further command, further comprising:
broadcasting a further suppression command to suppress a response to at least one subsequent command by the RF tags of the subset having the respective one of the different identifiers previously stored with the interrogator; and broadcasting the subsequent command to the subset, the RF tags of the subset suppressed by the further suppression command being nonresponsive to the subsequent command and the remainder of the RF tags of the subset being responsive to the subsequent command.

23. A method, comprising:
operating a number of RF tags included in an RF tag set, the RF tags each including a respective one of a corresponding set of different identifiers, the set of different identifiers being effective to uniquely identify a maximum tag quantity;
performing an interrogation with an RF tag interrogator to determine the respective one of the different identifiers of each of the RF tags in a subset, the subset numbering two or more of the RF tags and being at least one order of magnitude less than the maximum tag quantity; and
respective tags of the subset each responding by: waiting for a time period determined as a function of at least a randomly determined number and a delay period; detecting if a different tag of the subset is transmitting; if transmission by the different tag of the subset is detected, waiting for another time period determined as a function of at least another random number and the delay period; and transmitting the respective one of the unique identifiers to the interrogator if the transmission by the different tag is not detected.

24. The method of claim 23, which includes the respective tags each:
seeding a random number generator with a respective one of the different identifiers to generate the randomly determined number; and
seeding the random number generator with the randomly determined number to generate the second randomly determined number.

25. The method of claim 23, which includes performing multiple interrogation passes in a first period of time to register all of the RF tags of the subset.

26. The method of claim 25, wherein the delay period is shorter than a longer delay period, the longer delay period corresponding to that required to register all of the RF tags of the subset in a single pass in a second period of time, the second period of time being longer than the first period of time.

27. The method of claim 23, which includes empirically adjusting the delay period to reduce time for the interrogator to verify that the respective one of the different identifiers for all the RF tags of the subset have been reported.

28. A system, comprising:
RF communication circuitry operable to perform RF tag interrogation; and
an RF interrogator processing subsystem coupled to the RF communication circuitry, the processing subsystem being operable to register a number of deployed RF tags within a communication range of the RF communication circuitry by performing a registration procedure, the registration procedure including a tag report command to cause each of the deployed RF tags to transmit a unique identifier, the tag report command including one parameter corresponding to a maximum quantity of RF tag response time slots available and a different parameter corresponding to randomization of a selection of a respective one of the time slots by each of the deployed RF tags, the registration procedure being effective to determine if a communication collision occurred during one or more of the time slots in response to the tag report command and to store the unique identifier transmitted by each of the deployed RF tags during one or more other of the time slots for which the communication collision did not occur, the registration procedure further being effective to suppress response of one or more of the tags to a subsequent tag report command, the unique identifier for the one or more of the tags being previously recognized by the processing subsystem in response to the tag report command, wherein the RF communication circuitry and the RF interrogator processing subsystem are included in a portable RF interrogator, and
wherein the deployed RF tags each include:
RF tag communication circuitry; and
an RF tag processing subsystem coupled to the RF tag communication circuitry, the RF tag processing subsystem including a random number generator, the RF tag processing subsystem being effective to select the respective one of the time slots as a function of the parameter included in the information and a random number generated with the random number generator being seeded in accordance with the different parameter.

29. A system, comprising:
RF communication circuitry operable to perform RF tag interrogation; and
an RF interrogator processing subsystem coupled to the RF communication circuitry, the processing subsystem being operable to register a number of deployed RF tags within a communication range of the RF communication circuitry by performing a registration procedure, the registration procedure including a tag report command to cause each of the deployed RF tags to transmit a unique identifier, the tag report command including one parameter corresponding to a maximum quantity of RF tag response time slots available and a different parameter corresponding to randomization of a selection of a respective one of the time slots by each of the deployed RF tags, the registration procedure being effective to determine if a communication collision occurred during one or more of the time slots in response to the tag report command and to store the unique identifier transmitted by each of the deployed RF tags during one or more other of the time slots for which the communication collision did not occur, the registration procedure further being effective to suppress response of one or more of the tags to a subsequent tag report command, the unique identifier for the one or more of the tags being previously recognized by the processing subsystem in response to the tag report command, wherein the RF communication circuitry and the RF interrogator processing subsystem are included in a portable RF interrogator, and
wherein the deployed RF tags each include:
RF tag communication circuitry; and
an RF tag processing subsystem coupled to the RF tag communication circuitry, the RF tag processing subsystem including a random number generator and a unique identification number, the RF tag processing subsystem including in accordance with logic responsive to a first tag report command transmitted by the interrogator to: seed the random number generator with a first seed corresponding to the unique identifier to generate a first random number, determine a first time as a function of the first random number to attempt transmission of the unique identification number, seed the random number generator with a second seed corresponding to the first random number to generate a second random number if the transmission at the first time fails to be properly performed, and determine a second time as a function of the second random number to attempt the transmission of the unique identification number.

30. The system of claim 29, wherein the random number generator is of a pseudorandom type.

31. A system, comprising:
RF tag communication circuitry; and
an RF tag processing subsystem coupled to the RF tag communication circuitry, the processing subsystem including a random number generator, the random number generator being seeded in accordance with information received through the RF tag communication circuitry, the processing subsystem being effective to determine a time slot to transmit an identifier through the RF tag communication circuitry, the identifier being unique relative to a quantity of deployed RF tags, the time slot being determined as a function of a random number provided by the random number generator and a parameter included in the information, the parameter corresponding to a maximum quantity of transmission time slots to respond to a broadcast command, the maximum quantity of the time slots being less than the quantity of deployed RF tags by at least one order of magnitude.

32. The system of claim 31, wherein the random number generator is of a pseudorandom type.

33. The system of claim 31, wherein the RF tag communication circuitry and the RF tag processing subsystem are included in an active RF tag, the RF tag including one or more sensors.

34. The system of claim 33, further comprising several other RF tags deployed in a region.

35. The system of claim 33, further comprising means for interrogating the active RF tag, the interrogating means including means for broadcasting the information including the parameter.

36. The system of claim 31, wherein the logic is further responsive to a different parameter included in the information, the different parameter including a first form to seed the random number generator with the identifier and a second form to seed the random number generator with the random number previously generated with the random number generator.

37. A system, comprising:
RF tag communication circuitry; and
an RF tag processing subsystem coupled to the circuitry, the processing subsystem including a random number generator and a unique identification number, the processing subsystem including logic responsive to one or more commands received through the communication circuitry to: seed the random number generator with a first seed corresponding to the unique identification number to generate a first random number, determine a first time as a function of the first random number to attempt transmission of the unique identification number, seed the random number generator with a second seed corresponding to the first random number to generate a second random number if the transmission at the first time fails to be properly performed, and determine a second time as a function of the second random number to attempt the transmission of the unique identification number.

38. The system of claim 37, wherein the random number generator is of a pseudorandom type.

39. The system of claim 37, wherein the RF tag communication circuitry and the RF tag processing subsystem are included in an active RF tag.

40. The system of claim 39, wherein the logic is operable to detect transmission by a different active RF tag before performing the transmission at the first time and to determine the transmission at the first time fails to be properly performed if the different active RF tag is detected.

41. The system of claim 39, further comprising means for broadcasting the one or more commands with at least one of the commands including a parameter, the parameter corresponding to a maximum number of available RF tag response time slots, the logic being operable to randomly select one of the time slots, the one of the time slots corresponding to the first time.

42. The system of claim 39, further comprising several other RF tags deployed in a region.

43. The system of claim 39, further comprising an RF interrogator operable to broadcast a first tag report command belonging to the one or more commands, the first tag report command including information to direct the RF tag to seed the random number generator with the first seed, to determine if the transmission at the first time fails to be properly performed, and to broadcast a second tag report command to direct the RF tag to seed the random number generator with the second seed if failure of the transmission at the first time is detected.

44. The system of claim 43, wherein the logic is further responsive to a suppression command from the interrogator to suppress response to the second tag report command if the transmission at the first time of the unique identification number to be interrogator is successfully completed.

* * * * *